US008950570B2

(12) United States Patent
Bielenberg et al.

(10) Patent No.: US 8,950,570 B2
(45) Date of Patent: Feb. 10, 2015

(54) PASSIVE SOLIDS SUPPLY SYSTEM AND METHOD FOR SUPPLYING SOLIDS

(75) Inventors: James R. Bielenberg, Easton, PA (US); Michael Raterman, Doylestown, PA (US); Rathna P. Davuluri, Fairfax, VA (US); John W. Fulton, Annandale, VA (US); Steven W. Meier, Clinton, NJ (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 826 days.

(21) Appl. No.: 12/962,394

(22) Filed: Dec. 7, 2010

(65) Prior Publication Data
US 2011/0139257 A1 Jun. 16, 2011

Related U.S. Application Data

(60) Provisional application No. 61/284,233, filed on Dec. 15, 2009.

(51) Int. Cl.
| B65G 31/04 | (2006.01) |
| B01J 8/00 | (2006.01) |
| B65G 53/40 | (2006.01) |
| C10J 3/30 | (2006.01) |
| C10J 3/50 | (2006.01) |

(52) U.S. Cl.
CPC ............... B01J 8/003 (2013.01); B01J 8/0045 (2013.01); B65G 53/40 (2013.01); C10J 3/30 (2013.01); C10J 3/50 (2013.01); B01J 2208/00752 (2013.01); C10J 2300/093 (2013.01)
USPC ............. 198/642; 198/617; 406/98; 406/102; 406/197

(58) Field of Classification Search
USPC ..................... 198/642, 617; 406/98, 102, 197
See application file for complete search history.

(56) References Cited

U.S. PATENT DOCUMENTS

| 2,276,362 | A |   | 3/1942  | Wolf |
| 3,114,930 | A |   | 12/1963 | Oldham et al. |
| 3,856,658 | A | * | 12/1974 | Wolk et al. ..................... 208/415 |
| 4,137,053 | A |   | 1/1979  | Mitchell et al. |
| 4,159,886 | A | * | 7/1979  | Sage ............................. 414/292 |
| 4,180,353 | A | * | 12/1979 | Geidies ........................... 406/74 |
| 4,191,500 | A | * | 3/1980  | Oberg et al. .................. 406/146 |
| 4,377,356 | A | * | 3/1983  | Santhanam .................... 406/109 |
| 4,765,781 | A | * | 8/1988  | Wilks et al. ................... 406/197 |
| 4,807,819 | A |   | 2/1989  | Kreher et al. |

(Continued)

OTHER PUBLICATIONS

"Roller Compactors," Alexanderwerk AG, , Kippdorfstrabe 6-24, 42857 Remscheid, Germany.
Jerry R. Johanson, Brian D. Cox, "Fluid Entrainment Effects in Roll Press Compaction," J. R. Johanson, Inc. San Luis Obispo, CA 93401, pp. 251-263.

(Continued)

*Primary Examiner* — Joseph Dillon, Jr.
(74) *Attorney, Agent, or Firm* — Bruce M. Bordelon; Chad A. Guice

(57) ABSTRACT

A solids supply system having a solids deaeration zone and a solids pump zone, and a method for supplying the solids e.g., pulverized dry coal, to an application, e.g., gasification process. The solids deaeration zone includes a container having a passageway defined by one or more sloped walls. The solids deaeration zone is operable to deaerate and convey the solids to the solids pump zone. In the solids deaeration zone, the solids become sufficiently compacted prior to and upon entry into the solids pump zone to be effectively conveyed through the solids pump zone.

25 Claims, 10 Drawing Sheets

(56) References Cited

U.S. PATENT DOCUMENTS

| | | | |
|---|---|---|---|
| 4,988,239 A | | 1/1991 | Firth |
| 5,094,340 A | * | 3/1992 | Avakov ............... 198/626.1 |
| 5,485,909 A | | 1/1996 | Hay |
| 5,497,873 A | | 3/1996 | Hay |
| 5,657,704 A | | 8/1997 | Schueler |
| 7,387,197 B2 | | 6/2008 | Sprouse et al. |
| 7,402,188 B2 | * | 7/2008 | Sprouse ............... 48/77 |
| 7,579,385 B1 | | 8/2009 | Yamakoshi et al. |
| 8,307,974 B2 | * | 11/2012 | Saunders et al. ............ 198/626.1 |
| 8,439,185 B2 | * | 5/2013 | Fitzsimmons ............ 198/626.1 |
| 8,496,412 B2 | * | 7/2013 | Livingood et al. ............ 406/73 |
| 2004/0152790 A1 | | 8/2004 | Cornaro et al. |
| 2006/0243583 A1 | | 11/2006 | Sprouse et al. |
| 2007/0289861 A1 | | 12/2007 | Barkdoll et al. |
| 2008/0060914 A1 | | 3/2008 | Sprouse et al. |
| 2008/0256861 A1 | | 10/2008 | Van den Berg et al. |
| 2009/0125152 A1 | * | 5/2009 | Skowronski et al. ......... 700/281 |
| 2010/0320061 A1 | * | 12/2010 | Saunders et al. ........... 198/626.1 |

OTHER PUBLICATIONS

John C. Cunningham, A Thesis "Experimental Studies and Modeling of the Roller Compaction of Pharmaceutical Powders," submitted to the Faculty of Drexel University, Jul. 2005.

Ronald W. Miller, Paul J. Sheskey, "Roller Compaction Technology for the Pharmaceutical Industry," Encyclopedia of Pharmaceutical Technology, Third Edition, vol. 5, pp. 3159-3176.

J. R. Johanson, "Predicting Limiting Roll Speeds for Briquetting Presses," Proceedings, Institute for Briquetting and Agglomeration, vol. 13, pp. 89-99.

Roman T. Dec, "Problems with Processing of Fine Powders in Roll Press," K. R. Komarek Briquetting Research, Anniston, Alabama 36207, pp. 199-210.

Adapted from a paper by Ronald W. Miller, "Using a vacuum-deaeration feed system to minimize powder leakage during roll compaction," Powder and Bulk Engineering, vol. 11, No. 2, Feb. 1997, pp. 71-74.

* cited by examiner

PASSIVE SOLIDS SUPPLY SYSTEM AND METHOD FOR SUPPLYING SOLIDS

CROSS REFERENCE TO RELATED APPLICATIONS

This application claims the benefit of U.S. Provisional Application No. 61/284,233 filed Dec. 15, 2009.

FIELD OF THE DISCLOSURE

This disclosure generally relates to solids supply systems having a solids deaeration zone and a solids pump zone, and to methods for supplying the solids e.g., pulverized dry coal, to an application, e.g., gasification process. The solids deaeration zone includes a container having a passageway defined by one or more sloped walls. The solids pump zone includes a solids pump, for example, a belt (tractor), a roller or a rotary pump.

DISCUSSION OF THE BACKGROUND ART

The coal gasification process involves turning coal or other carbon-containing solids into synthesis gas. While both dry coal and a water slurry can be used in the gasification process, dry coal pumping is more thermally efficient than current water slurry technology. A wide variety of equipment has been used for pumping particulate material. Such transport equipment includes conveyor belts, rotary valves, lock hoppers, screw-type feeders, and the like.

One of the devices currently being used to pump dry coal to a high pressure is the cycling lock hopper. While the thermal cold gas efficiency of cycling lock hopper fed gasifiers is higher than other currently available water slurry technology in the gasification field, the mechanical efficiency of the cycling lock hopper is relatively low. The capital costs and operating costs of cycling lock hoppers are also high due to the high pressure tanks, valves, and gas compressors required in the cycling lock hopper process.

The use of dry coal extrusion pumps has become more common in dry coal gasification. However, some of the problems associated with currently available dry coal extrusion pumps are internal shear failure zones and flow stagnation problems. The presence of failure zones can lead to a decreased mechanical efficiency in the pump, as they result in a loss of the ability to transmit forces from the mechanical drive into transport of the particulate material.

For example, in dry coal extrusion type pumps such as rotary disk type pumps, particulate material enters a transport duct between two drive disk walls and is driven by movement of the drive walls from an inlet toward an outlet. The movement of the drive walls compacts the particles such that the particles transmit stresses across contacts with each other and the particulate material engages the drive walls, resulting in a drive force being transferred from the drive walls to the particulate material. As the particulate material enters the transport duct, it should be sufficiently compacted or compressed prior to or upon entry into the pumping apparatus to cause the particles to transmit stresses across their contacts, resulting in the formation of, what is referred to herein as, a transient solid or bridge composed of compacted particulate material that allows the solids pump to develop head or pressure in the particulate material and effectively convey the particulate material through the solids pump to a region of higher pressure. Successive bridges should occur cumulatively within the transport duct as further particulate material enters the inlet.

Fine particulate and powdery materials, such as dry pulverized coal, are difficult to effectively convey through the pumping system. Fine particulate and powdery materials tend to be aerated or be well mixed with a gas when transported loosely or when loosely dropped through the inlet. The aerated fine particulate and powdery material may not be compacted enough to form a stress transmitting bridge of contacting particles between the rotary disks of the pumping device. As a result, the frictional force acting on the material by the rotary disks is not enough to transfer drive force to the material. Consequently, the fine particulate and powdery material may slip between the rotary disks and may not be effectively conveyed through the pumping device. If too much external force is applied to attempt to compress or deaerate the powdery material, the material tends to overly consolidate, clogging the inlet or the transport channel.

Thus, there is a need in the industry for an effective particulate transporting system for efficiently transporting fine particulate materials, particularly pulverized coal, using dry solids pumps that require particle bridging that allows the pumps to develop head or pressure in the particulate material.

SUMMARY OF THE DISCLOSURE

An embodiment of the present invention is a solids supply system comprising:
(i) a solids deaeration zone, and
(ii) a solids pump zone;
wherein said solids deaeration zone is in flow communication with said solids pump zone; said solids deaeration zone comprises a container having a passageway defined by one or more sloped walls; an inlet for introducing solids into the passageway; an outlet for dispensing solids from the passageway into said solids pump zone; wherein said one or more sloped walls converge in the longitudinal direction from the inlet toward the outlet, forming a wall angle to a vertical plane; said solids deaeration zone operable to deaerate and convey the solids by gravity to said solids pump zone, wherein said solids become sufficiently compacted prior to and upon entry into said solids pump zone to be effectively conveyed through said solids pump zone; said solids deaeration zone being fluidly connected to a region of lower pressure than said solids deaeration zone wherein at least a portion of a fluidization gas in said solids is withdrawn from said solids deaeration zone; and
wherein said solids pump zone comprises a solids pump operable to convey said solids to an application.

In a preferred embodiment, the container of the solids supply system is of a substantially rectangular shape and has a maximum aspect ratio ($H_{max}/G$) determined by the equation:

$$\frac{H_{max}}{G} = \frac{2.5W(1 - \kappa\sin\varphi\cos(\varpi + \kappa\varphi_{wall}))}{2(W + G)\tan\varphi_{wall}(1 + \kappa\sin\varphi\cos(\varpi + \kappa\varphi_{wall}))}$$

where:

$$\sin\varpi = \frac{\sin\varphi_{wall}}{\sin\varphi}$$

wherein $H_{max}$ is the maximum height, G is the Gap Dimension between the opposing pump moving walls at the inlet to the solids pump, W is the width of the deaeration zone, $\varphi$ is the internal friction angle of the particulate (granular) material, $\varphi_{wall}$ is the wall friction angle of the particulate (granular) material, and $\kappa=1$ is the active state of the solids.

In another preferred embodiment, the container of the solids supply system is of a substantially conical shape and has a maximum aspect ratio ($H_{max}/D_o$) determined by the equation:

$$\frac{H_{max}}{D_o} = \frac{2.5(1 - \kappa\sin\varphi\cos(\varpi + \kappa\varphi_{wall}))}{4\tan\varphi_{wall}(1 + \kappa\sin\varphi\cos(\varpi + \kappa\varphi_{wall}))}$$

where:

$$\sin\varpi = \frac{\sin\varphi_{wall}}{\sin\varphi}$$

wherein $H_{max}$ is the maximum height, $D_o$ is the dimension of the deaeration zone outlet diameter, $\phi$ is the internal friction angle of the particulate (granular) material, $\phi_{wall}$ is the wall friction angle of the particulate (granular) material, and $\kappa=1$ is the active state of the solids.

In a preferred embodiment, the solids comprise a Geldart classification type "A" or "C" material, and even more preferably, the solids comprise a pulverized dry coal.

Another preferred embodiment of the invention herein is a method for transporting solids comprising:

(i) providing a solids deaeration zone and a solids pump zone, wherein said solids deaeration zone is in flow communication with said solids pump zone; said solids deaeration zone comprises a container having a passageway defined by one or more sloped walls; an inlet for introducing solids into the passageway; an outlet for dispensing solids from the passageway into said solids pump zone; wherein said one or more sloped walls converge in the longitudinal direction from the inlet toward the outlet, forming a wall angle to a vertical plane; said solids deaeration zone operable to deaerate and convey the solids by gravity to said solids pump zone; said solids deaeration zone being fluidly connected to a region of lower pressure than said solids deaeration zone wherein at least a portion of a fluidization gas in said solids is withdrawn from said solids deaeration zone; and said solids pump zone comprises a solids pump operable to transport said solids; and (ii) deaerating the solids in the solids deaeration zone, wherein said solids become sufficiently compacted prior to and upon entry into said solids pump zone to be effectively conveyed through said solids pump zone; and (iii) pumping the solids in the solids pump zone to an application.

Further objects, features and advantages of the present disclosure will be understood by reference to the following drawings and detailed description.

DETAILED DESCRIPTION OF THE PREFERRED EMBODIMENTS

In accordance with this disclosure, a solids supply system is provided that includes a solids source zone, a solids deaeration zone and a solids pump zone. The solids supply system allows for conveying the solids in a dense phase flow. The solids deaeration zone allows the solids material to deaerate just prior to entering the solids pump zone, e.g., a variable speed, high pressure solids pump, and allows any entrained gas to be vented via an external conduit. The deaeration zone is located just ahead of the solids pump zone, e.g., the solids pump inlet. The solids pump zone includes, for example, a variable speed, high pressure solids pump having a pump inlet and a pump outlet, the pump inlet connected to the solids deaeration zone. The solids pump outlet can be connected to an application such as a gasification process, or to a dispenser vessel for dispensing the solids to an application. The dispenser vessel can be maintained at a higher pressure than the solids source zone.

As a volume of particulate material moves down through the solids deaeration zone, the particulate material gradually deaerates. As a result, the particulate material achieves a certain degree of compaction adjacent to an inlet port to the solids pump zone and forms relatively strong stress transmitting particle contact bridges between the solids pump zone components adjacent the inlet port. As a consequence, the particulate material is effectively conveyed into the transport channel and driven by the motion of the solids pump without substantial slipping between the particulate material and the internal surfaces of the solids pump. The particulate material moving through the solids deaeration zone can be deaerated to very low levels, well below the fluidization threshold.

This disclosure includes a solids supply system in which solids, such as pulverized coal, are provided to and stored at atmospheric or low pressure in a reservoir, from where the solids are discharged and conveyed to an application through a solids pump, e.g., a variable speed high pressure solids pump. A solids deaeration zone is provided just upstream of the solids pump zone to maintain proper inlet conditions so that the pump will operate properly. The high pressure solids pump may be connected to a gasification process or other application which requires a supply of solids, such as pulverized coal, through a dense phase discharge line. The solids pump outlet can also be connected to a dispenser vessel for dispensing the solids to an application. In some systems the dense phase discharge from the solids pump to an application may be diluted with the addition of a fluidizing gas for improved flow characteristics.

Figure 1:
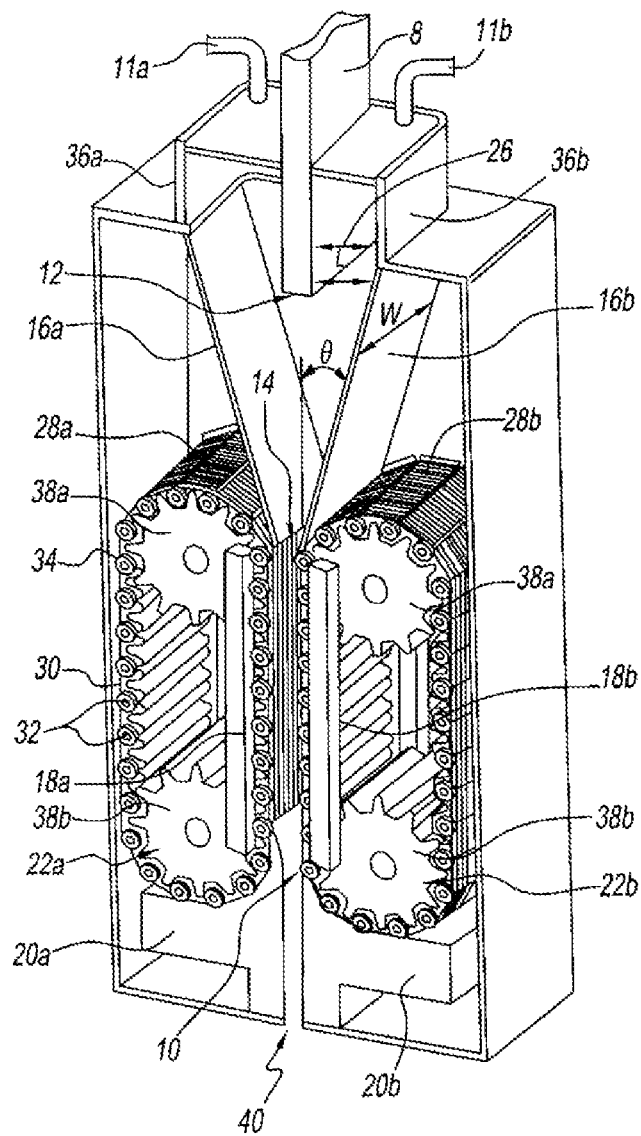
FIG. 1 is a perspective view of a solids supply system including a solids deaeration zone and a solids pump (belt/tractor) zone.

FIG. 1 shows a perspective view of a solids supply system including a solids deaeration zone and a solids pump zone for transporting pulverized dry coal. The system has increased efficiency by eliminating shear failure zones and flow stagnation zones. Shear failure zones interfere with the ability to transmit a driving stress across the particulate material. Flow stagnation zones occur where pulverized dry coal is driven into walls at substantially right angles or impinged by other pulverized dry coal moving in the opposite direction. By substantially reducing or eliminating shear failure zones and flow stagnation zones, the mechanical efficiency of the system can approach approximately 80%. In addition, the system is capable of pumping pulverized dry coal into gas pressure tanks with internal pressures of over 1200 pounds per square inch absolute.

In a preferred embodiment, the solids pump zone is comprised of an inlet and an outlet and the differential pressure between the solids pump zone outlet and solids pump zone inlet is from 200 to 2,000 psig. More preferably, the solids pump zone is comprised of an inlet and an outlet and the differential pressure between the solids pump zone outlet and solids pump zone inlet is from 500 to 1,500 psig. It should be noted that although the system is discussed as transporting pulverized dry coal, the system may transport any dry particulate material and may be used in various industries, including, but not limited to the following markets: petrochemical, electrical power, food, and agricultural.

The solids supply system depicted in FIG. 1 generally includes a solids deaeration zone and a solids pump zone. The solids deaeration zone generally includes inlet duct 8, inlet duct discharge area 12, opposed sloped walls 16a and 16b, opposed straight walls 36a and 36b, and deaeration plenum vents 11a and 11b. Pulverized dry coal is introduced into the solids deaeration zone at inlet duct 8, and passed into inlet duct discharge area 12. The sloped walls of the deaeration plenum 16a and 16b operate to convey (and allow deaeration) the solids through the solids deaeration zone into the solids pump zone inlet 14. A vacuum or negative pressure source is connected to the deaeration plenum vents 11a and 11b in order to create a lower pressure in the solids deaeration zone than in the duct or feed supply system connected to the inlet of the solids deaeration zone.

It should be noted herein the that the terms "vacuum", "vacuum pressure" or "negative pressure" as used herein are equivalents and unless otherwise specified, these terms mean a lower pressure in the first zone referenced with respect to the pressure to a second referenced zone. As such, these terms are not limited to a pressure that is lower than standard atmospheric pressure.

The opposed sloped walls 16a and 16b each form an angle (θ) to a vertical plane. The sloped walls 16a and 16b converge in the longitudinal direction from the inlet toward the outlet defining a solids flow angle. The solids flow angle can range from about 5 degrees to about 85 degrees, preferably from about 10 degrees to about 55 degrees, and more preferably from about 15 degrees to about 45 degrees. The solids flow angle should be sufficient to deaerate and convey the solids by gravity to the solids pump zone. The solids flow angle should be sufficient for the solids to become compacted prior to and upon entry into the solids pump zone and effectively conveyed through the solids pump zone.

The container has a height or depth sufficient to deaerate and convey the solids by gravity to the solids pump zone. The height or depth (i.e., vertical distance from the inlet to the outlet of the container) preferably ranges from about 0.1 meters (m) to about 3.0 m, more preferably from about 0.1 m to about 2.0 m, and even more preferably from about 0.1 m to about 1.0 m. The height or depth should be sufficient for the solids to become compacted prior to and upon entry into the solids pump zone and effectively conveyed through the solids pump zone.

The top surface 26 formed by the solids as they flow into the container forms a surface area termed herein as the particulate material free surface area which is sufficient to provide sufficient deaeration of the fluidized solids entering the deaeration zone and convey the solids by gravity to the solids pump zone without bridging or binding of the de-aerated solids. The particulate material free surface area can range from about 0.1 meters squared ($m^2$) to about 10.0 $m^2$, preferably from about 0.1 $m^2$ to about 5.0 $m^2$, and more preferably from about 0.1 $m^2$ to about 1.0 $m^2$. The particulate material free surface area should be sufficient for the solids to become compacted prior to and upon entry into the solids pump zone and effectively conveyed through the solids pump zone.

The distance (L) 26 between the outside wall of the inlet duct 8 and either the straight walls 36a or 36b or the sloped walls 16a or 16b defines the length of the particulate material free surface area, depending on the level of solids maintained in the solids deaeration zone. The width (W) of the deaeration plenum sloped walls 16a and 16b and straight walls 36a and 36b are set by the width of first belt assembly 28a and second belt assembly 28b As the pulverized dry coal moves down through the solids deaeration zone, the particulate material deaerates and compacts to a degree. As a result, the pulverized dry coal achieves a certain degree of deaeration and compaction adjacent the inlet feed zone 14 of the solids pump zone and forms relatively strong stress transmitting particle contact bridges between the solids pump zone components adjacent the inlet feed zone 14. Accordingly, the suitably compacted pulverized dry coal is effectively gripped and moved between the solids pump zone components without substantial slippage between the pulverized dry coal and internal surfaces of the solids pump zone.

The solids pump zone includes passageway 10, pump high pressure discharge 40, first load beam 18a, second load beam 18b, first outlet scraper 20a, second outlet scraper 20b, first drive assembly 22a, and second drive assembly 22b. Pulverized dry coal is introduced into the solids pump at inlet feed zone 14, passed through passageway 10, and expelled from the pump at pump high pressure discharge outlet 40. Passageway 10 is defined by first belt assembly 28a and second belt assembly 28b, which are positioned substantially parallel and separated by a Gap Dimension "G". The Gap Dimension "G" is measured in a plane perpendicular to the planes formed by the solids pump's opposing moving walls. This Gap Dimension "G" can be measured for a belt (or tractor) pump as the distance between the two moving belts at the inlet of the solids pump; or "G" can be measured for a belt roller pump as the distance between the first two opposing moving rollers at the inlet of the solids pump; or "G" can be measured for a rotary solids pump as the distance between the two opposing walls of the rotating disk at the inlet of the rotary solids pump.

First belt assembly 28a is formed from belt links 30 connected to each other by link rotation axles 32 and track wheels 34. Link rotation axles 32 allow belt links 30 to form a flat surface as well as allow belt links 30 to bend around first drive assembly 22a. First belt assembly 28a defines an inner section in which a first drive assembly (not shown) is located. Track wheels 34 cover ends of link rotation axles 32 and function to transfer the mechanical compressive loads normal to belt links 30 into load beam 18a. In an exemplary embodiment, first belt assembly 28a is formed from between approximately thirty-two (32) and approximately fifty (50) belt links 30 and link rotation axles 32. First belt assembly 28a, together with second belt assembly 28b, transports the pulverized dry coal through passageway 10.

Second belt assembly 28b includes belt links 30, link rotation axles 32, track wheels 34, and a second inner section (not shown). Belt links 30, link rotation axles 32, track wheels 34, and the second inner section are connected and function in the same manner as belt links 30, link rotation axles 32, track wheels 34, and the first inner section of first belt assembly 28a.

First and second load beams 18a and 18b are positioned within first belt assembly 28a and second belt assembly 28b, respectively. First load beam 18a carries the mechanical load from first belt assembly 28a and maintains the section of first belt assembly 28a defining passageway 10 in a substantially linear form. The pulverized dry coal being transported through passageway 10 creates solid stresses on first belt assembly 28a in both a compressive outward direction away from passageway 10 as well as in a shearing upward direction toward inlet 14. The compressive outward loads are carried from belt links 30 into link rotation axles 32, into track wheels 34, and into first load beam 18a. First load beam 18a thus prevents first belt assembly 28a from collapsing into the first interior section of first belt assembly 28a as the dry pulverized coal is transported through passageway 10. The shearing upward loads are transferred from belt links 30 directly into drive sprockets 38a and 38b and drive assembly 22a.

Second load beam 18b is formed and functions in the same manner as first load beam 18a to maintain second belt assembly 28b in a substantially linear form at passageway 10 and to transfer outward compressive and upward shearing loads from belt links 30 to second load beam 18b, drive sprockets 38a and 38b, and second drive assembly 22b.

First scraper seal 20a and second scraper seal 20b are positioned proximate passageway 10 and outlet 40. First belt assembly 28a and first scraper seal 20a form a seal between the pump and the outside atmosphere. Thus, the few pulverized dry coal particles that become caught between first belt assembly 28a and first scraper seal 20a become a moving pressure seal for first belt assembly 28a. The exterior surface of first scraper seal 20a is designed to make a small angle with the straight section of first belt assembly 28a in order to scrape the pulverized dry coal stream off from moving first belt assembly 28a. The angle prevents pulverized dry coal stagnation that may lead to low pump mechanical efficiencies. In an exemplary embodiment, first scraper seal 20a makes a 15 degree angle with the straight section of first belt assembly 28a. First scraper seal 20a may be made of any suitable material, including, but not limited to, hardened tool steel.

Second scraper seal 20b is formed and functions in the same manner as first scraper seal 20a to prevent stagnation at second belt assembly 28b.

First drive assembly 22a is positioned within the first interior section of first belt assembly 28a and drives first belt assembly 28a in a first direction. First drive assembly 22a includes at least two drive sprockets 38a and 38b positioned at opposing ends of first belt assembly 28a. Each of drive sprockets 38a and 38b has a generally circular shaped base with a plurality of sprocket teeth protruding from the base. The sprockets interact with first belt assembly 28a and drives first belt assembly 28a around drive sprockets 38a and 38b. In an exemplary embodiment, first drive assembly 22a rotates first belt assembly 28a at a rate of between approximately 0.1 feet per second and approximately 5.0 feet per second (ft/s). First drive assembly 22a more preferably rotates first belt assembly 28a at a rate of between approximately 0.5 ft/s and about 1.5 ft/s. The drive sprockets 38a and 38b include the required drive mechanisms known in the art that allow the drive assemblies to function.

Likewise, second drive assembly 22b includes at least two drive sprockets 38a and 38b positioned within the second interior section of second belt assembly 28b for driving second belt assembly 28b. Second drive assembly 22b is formed and functions in the same manner as first drive assembly 22a, except that second drive assembly 22b drives second belt assembly 28b in a second direction. The drive sprockets 38a and 38b include the required drive mechanisms known in the art that allow the drive assemblies to function.

Figure 2:
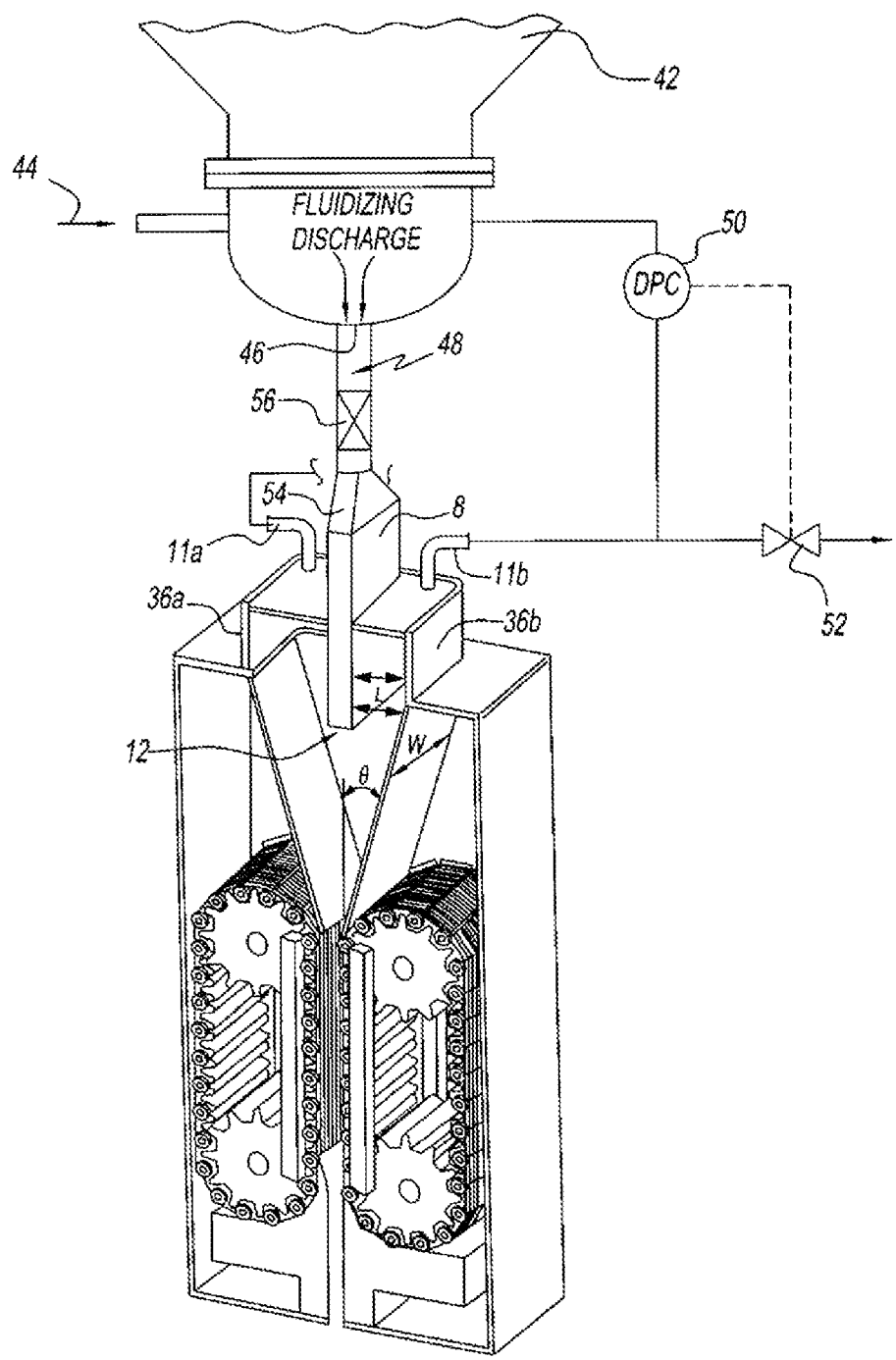
FIG. 2 is a perspective view of a solids supply system including a solids source zone, a solids deaeration zone and a solids pump (belt/tractor) zone.

FIG. 2 shows a perspective view of a solids supply system including a solids source zone, a solids deaeration zone and a solids pump zone for transporting pulverized dry coal. Like the system depicted in FIG. 1, this system has increased efficiency by eliminating shear failure zones and flow stagnation zones.

The solids supply system depicted in FIG. 2 is essentially the same as the solids supply system depicted in FIG. 1 except for the addition of a solids source zone. The solids supply system depicted in FIG. 2 includes an atmospheric reservoir 42, a fluidizing discharge outlet 46, a dense phase discharge conduit 48, and a dense phase discharge outlet 54 connected to inlet duct 8 in the solids deaeration zone. Preferably, an isolation valve 56 is positioned between the fluidizing discharge outlet 46 and the dense phase discharge outlet 54 to assist in isolating parts of the system for cleaning and maintenance purposes, and for helping to regulate the solids flow out of the reservoir.

The solids, e.g., pulverized dry coal, are conveyed by gravity through fluidizing discharge outlet 46, dense phase discharge conduit 48, and dense phase discharge outlet 54, to the solids deaeration zone (via inlet duct 8). Reservoir 42, which may be several atmospheres or atmospheric pressure, may have fluidizing gas added (via fluidizing gas connection 44) to facilitate the dense phase flow of solids into the deaeration zone. Additional fluidizing gas may also be provided to the outlet of the solids source zone, in order to maintain and assist in regulating the discharge flow to the solids deaeration zone. In this embodiment, a differential pressure controller 50 is positioned between the bottom of the atmospheric reservoir 42 and the top of the deaeration plenum to control the differential pressure control valve 52. The differential pressure control valve 52 is connected to the deaeration plenum vents 11a and 11b in order to control the flow of fluidizing gas vented or vacuumed from the solids deaeration zone in order to create a lower pressure (or "negative pressure") in the solids deaeration zone relative to the bottom of the solids source zone. Preferably, an isolation valve 56 is positioned between the fluidizing discharge outlet 46 and the dense phase discharge outlet 54 to assist in isolating parts of the system for cleaning and maintenance purposes, and for helping to regulate the solids flow out of the reservoir.

As the pulverized dry coal moves down through the solids deaeration zone, the particulate material deaerates and compacts to a degree. As a result, the pulverized dry coal achieves a certain degree of deaeration and compaction adjacent the inlet feed zone of the solids pump zone and forms relatively strong stress transmitting particle contact bridges between the solids pump zone components adjacent the inlet feed zone. Accordingly, the suitably compacted pulverized dry coal is effectively gripped and moved between the solids pump zone components without substantial slippage between the pulverized dry coal and internal surfaces of the solids pump zone. The solids deaeration zone and solids pump zone are substantially the same as described above for FIG. 1.

Figure 3:
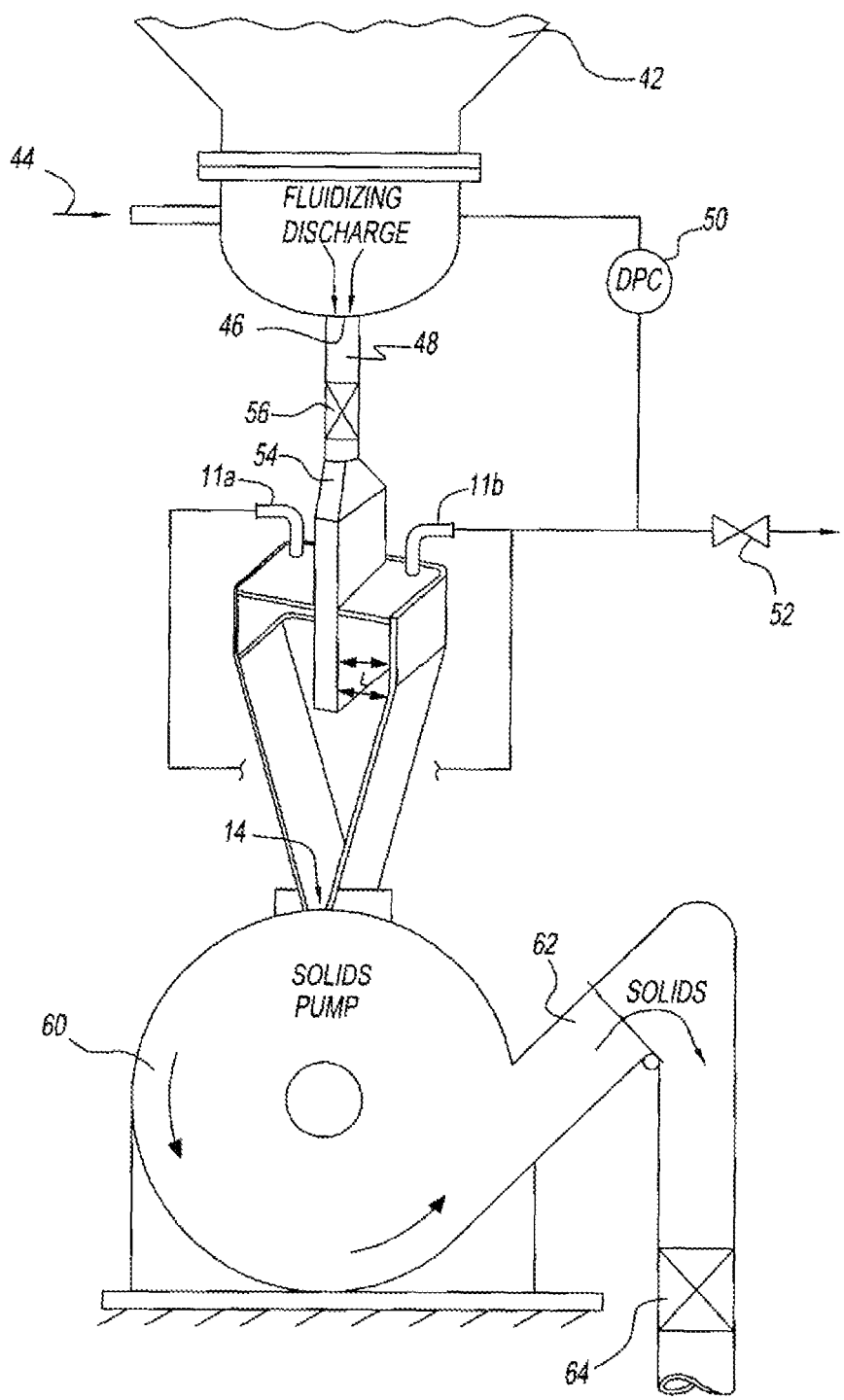
FIG. 3 is a perspective view of a solids supply system including a solids source zone, a solids deaeration zone and a solids pump (rotary) zone.

FIG. 3 shows a perspective view of a solids supply system including a solids source zone, a solids deaeration zone and a solids pump zone for transporting pulverized dry coal. Although the system is discussed as transporting pulverized dry coal, the system may transport any dry particulate material and may be used in various industries including, but not limited to, the following markets: petrochemical, electrical power, food, and agricultural.

The solids supply system depicted in FIG. 3 is essentially the same as the solids supply system depicted in FIG. 2 except the solids pump zone contains a rotary pump instead of a belt (tractor) pump. The solids supply system depicted in FIG. 3 includes the inlet feed zone 14 of the solids pump zone, a rotary solids pump 60 and an outlet duct 62. In a more preferred embodiment, an isolation valve 64 is positioned after outlet duct 62 to assist in isolating parts of the system for cleaning and maintenance purposes.

Figure 7:
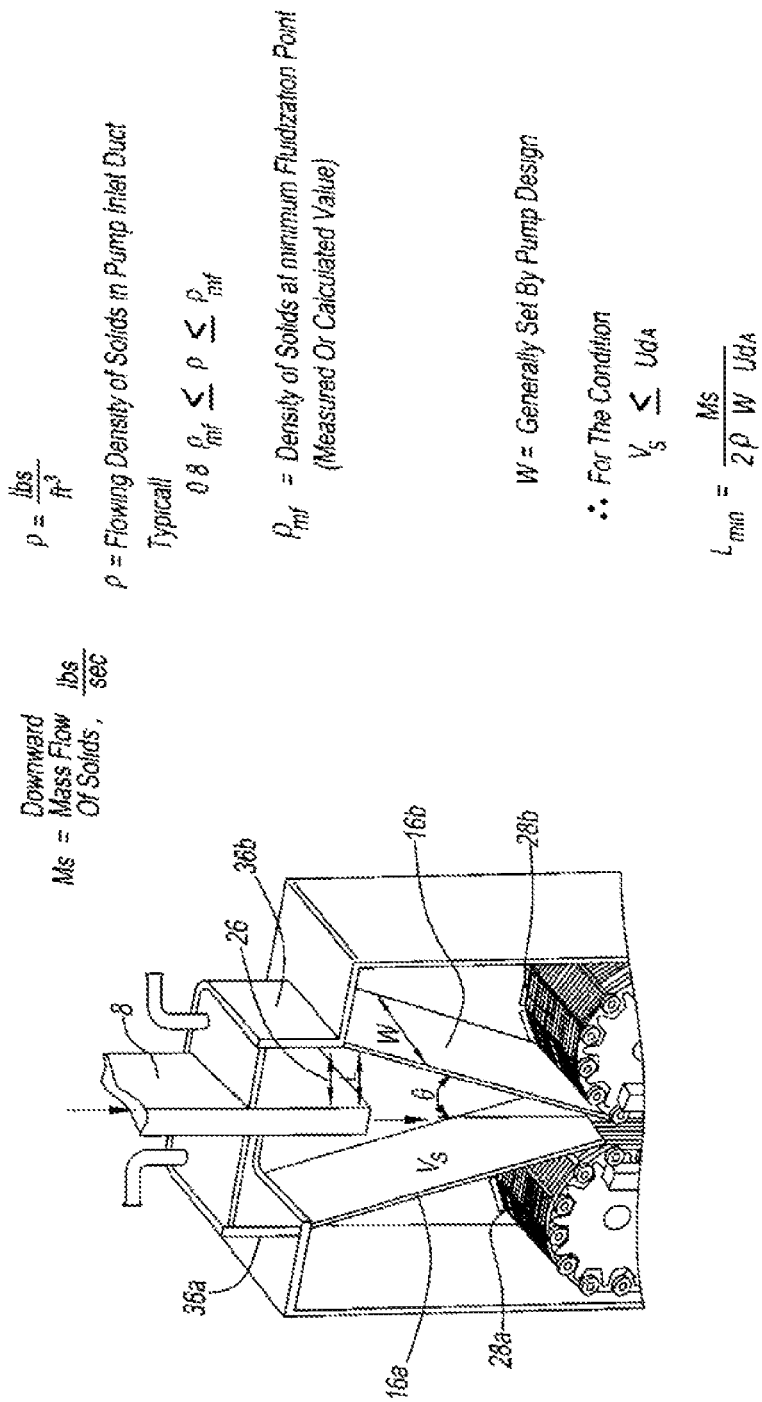
FIG. 7 is a perspective view of a solids supply system including a solids deaeration zone and part of a solids pump (belt/tractor) zone.

FIG. 7 shows a perspective view of a solids supply system including a solids deaeration zone and part of a solids pump zone for transporting pulverized dry coal. The solids supply system depicted in FIG. 7 is essentially the same as the solids supply system depicted in FIG. 1. FIG. 7 is used to illustrate a calculation for determining the length (L) in the solids deaeration zone, i.e., the distance between the outside wall of the inlet duct 8 and either the straight walls 36a or 36b or the sloped walls 16a or 16b at the deaeration surface 26. As indicated above, the distance (L) between the outside wall of the inlet duct 8 and either the straight walls 36a or 36b or the sloped walls 16a or 16b defines the length of the deaeration surface 26. The width (W) of the deaeration plenum sloped walls 16a and 16b and straight walls 36a and 36b are set by the width of first belt assembly 28a and second belt assembly 28b.

Figure 4:
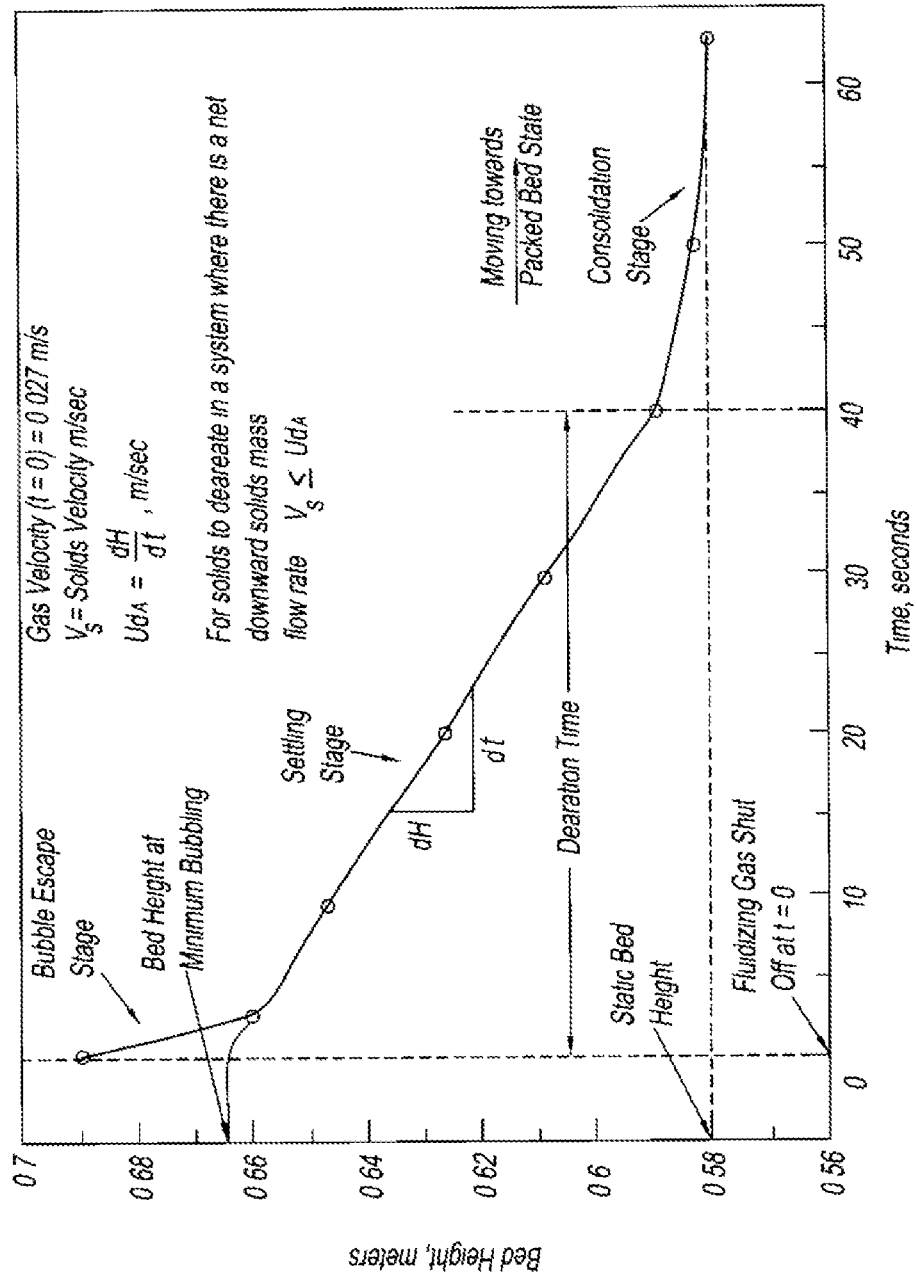
FIG. 4 is a graphical representation of a deaeration curve for solids designated "A" in Geldart's powder classification.

Referring to FIG. 7, the first step in determining L is to determine theoretical minimum length "$L_{min}$" which is calculated based on $M_s$=downward mass flow of solids (lbs./sec.) and ρ=flowing density of solids in inlet duct 8 (lbs./ft.$^3$). Typically, $0.8\,\rho_{mf}$ is less than or equal to ρ which is less than or equal to $\rho_{ABD}$ ($\rho_{mf}$ is the density of solids at minimum fluidization point and $\rho_{ABD}$ is the Apparent Bulk Density which are measured or calculated values). The width (W) of the deaeration plenum sloped walls is generally set by the solids pump design. The $L_{min}$ calculation satisfies the condition $V_s$ (solids net downward velocity in ft/sec) is less than or equal to UdA (bed height settling (deaeration) in the deaeration container as a function of time and is equal to dH/dt in meters/sec). UdA is illustrated in FIG. 4. The $L_{min}$ calculation for a substantially rectangular shaped deaeration zone is as follows:

$$L_{min}\text{(for rectangular zone)}=M_s/(2\rho)(W)(UdA) \qquad \text{(Eq. 1A)}$$

Referring to FIG. 7, for a substantially rectangular shaped deaeration zone the preferred length L in the embodiment is from about 0.5 times $L_{min}$ to about 1.5 times $L_{min}$. More preferably, the length L in the embodiment is from about 0.8 times $L_{min}$ to about 1.25 times $L_{min}$.

For a substantially conical shaped deaeration zone $D_{a\,min}$ is the theoretical minimum diameter for a substantially conical shaped deaeration zone. $D_a$ is shown for a substantially conical section in FIG. 8. As such, the $D_{a\,min}$ calculation for a substantially conical shaped deaeration zone is as follows:

$$D_{a\,min}\text{(for conical zone)}=[4^*M_s/(\rho)(UdA)(\pi)]^{0.5} \qquad \text{(Eq. 1B)}$$

Figure 8:
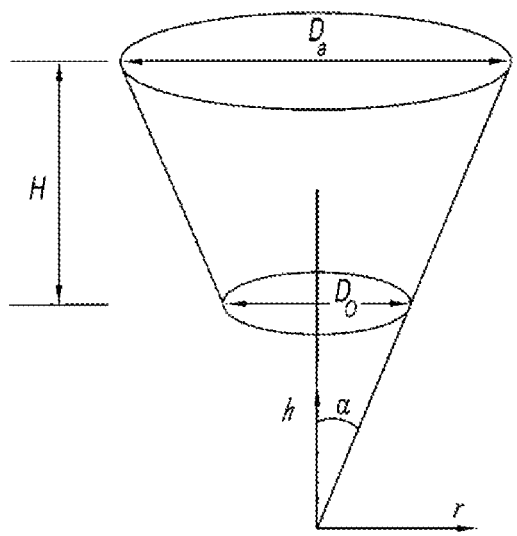
FIG. 8 is a drawing of design parameters for a cone shaped deaeration zone. $D_a$ is the diameter of the top of the cone. $D_o$ is the outlet diameter of the cone. $\alpha$ is the cone angle. H is the height of the cone. The coordinate system (r, θ, h) has its origin at the apex of the cone.

Referring to FIG. 8, for a substantially conical shaped deaeration zone the preferred diameter $D_a$ in the embodiment is from about 0.5 times $D_{a\,min}$ to about 1.5 times $D_{a\,min}$. More preferably, the diameter $D_a$ in the embodiment is from about 0.8 times $D_{a\,min}$ to about 1.25 times $D_{a\,min}$.

This disclosure involves providing solids to a solids source zone, e.g., reservoir, maintained at atmospheric pressure, passing the solids through a solids deaeration zone to deaerate the solids, and passing the solids to a solids pump zone, e.g., a variable speed, high pressure solids pump. The pump is used to pressurize the solids and convey the solids to an application or a pressurized dispenser vessel for further dispensing the solids to an application. The solids may be supplied to an application from the dispenser vessel by conveying the solids through a discharge line or other apparatus.

The solids source zone is in flow communication with the solids deaeration zone and includes at least one storage vessel or reservoir. The solids, e.g., pulverized dry coal, are conveyed by gravity from the solids source zone to the solids deaeration zone. The solids source zone, e.g., reservoir, may have fluidizing gas added to facilitate the dense phase flow of solids into the deaeration zone. Additional fluidizing gas may also be provided to the outlet of the solids source zone, in order to maintain the dense phase flow through the discharge outlet and assist in regulating the discharge flow to the solids deaeration zone. The solids source zone, e.g., reservoir, may also include pneumatic assistance to facilitate the dense phase flow of solids into the deaeration zone.

Although not required for purposes of this invention, valves, e.g., isolation valves, may be added at one or more points between the solids source zone, e.g., reservoir, and solids deaeration zone to assist in isolating parts of the system for cleaning and maintenance purposes. Further, vents may be provided in the solids source zone for helping to regulate the solids flow out of the reservoir.

The storage reservoir is preferably maintained at atmospheric or near atmospheric pressure. The storage reservoir may be inerted (such as with nitrogen or $N_2$) from a source of inerting gas or remain uninerted, depending on the combustibility of the fine solids therein. A reservoir outlet connects to the solids deaeration zone.

The collection and storage reservoir is supplied with solids, such as pulverized coal, from solids source. The reservoir has fluidizing gas provided to fluidize the solids within the reservoir to maintain a dense phase flow through outlet and into the solids deaeration zone. The reservoir may have one or more vent inlets near its top. The reservoir may be filled from solids source by any known methods, including but not limited to gravity, a belt type feeder, or a rotary feed pump, and the like.

The solids source zone can have a single reservoir that receives solids in the form of pulverized coal. The coal source can include reclaimed pulverized coal from sources such as baghouse filters and cyclones. The coal source can also include a primary source of pulverized coal such as from a pulverizer or crusher.

Figure 5:
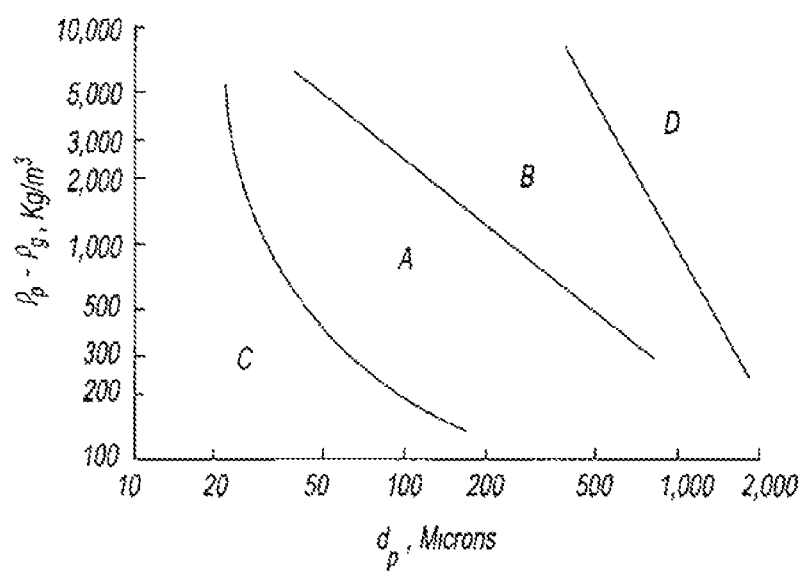
FIG. 5 is a graphical representation of Geldart's powder classification.

FIG. 5 is a graphical representation of Geldart's powder classification. See, for example, Geldart, D, *Powder Technology*, 7, 285-292 (1973). Referring to FIG. 5, the designation "A" includes aeratable material ($U_{mb}>U_{mf}$) having a significant deaeration time such as pulverized dry coal, FCC catalysts, and the like. The designation "B" includes materials that bubble above $U_{mf}$ ($U_{mb}=U_{mf}$) such as 500 micron sand, and the like. The designation "C" includes cohesive materials, such as flour, fly ash, and the like. The designation "D" includes spoutable materials, such as wheat, 2000 micron polyethylene pellets, and the like. The graph applies at ambient conditions. The solids useful in this disclosure typically fall within the areas designated "A" and "C" in FIG. 5 and are therefore not subject to fluidized flow without additional aeration.

Figure 6:
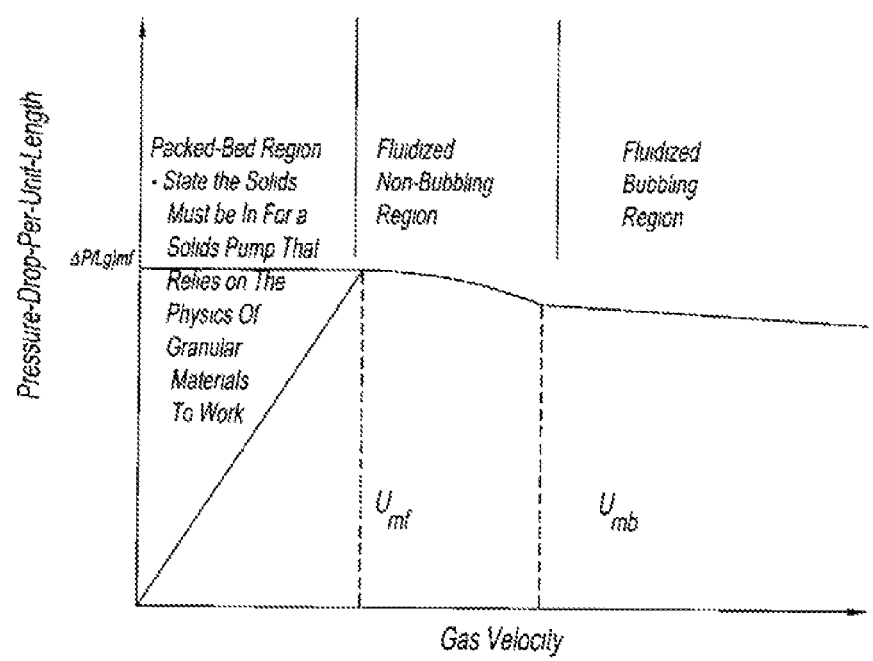
FIG. 6 is a graphical representation of a fluidization curve for solids designated "A" in Geldart's powder classification.

FIG. 6 is a graphical representation showing the relationship between pressure drop per unit length and gas velocity. A packed bed region, a fluidized non-bubbling region $U_{mf}$ and a fluidized bubbling region $U_{mb}$ are shown. The state of the solids must be in the packed bed region for a solids pump that relies on the physics of particulate (granular) materials to work.

The solids source zone may be constructed separately from the solids deaeration zone, in which case, the solids source zone and the inlet duct to the solids deaeration zone can be connected by any appropriate means, such as welds, coupleable flanges, bolts connectors or the like. Alternatively, the solids source zone and the inlet duct to the solids deaeration zone may be formed as a unitary structure.

The solids deaeration zone is in flow communication with the solids source zone and the solids pump zone. The solids deaeration zone is comprised of a container having a passageway defined by at least two sloped walls opposed to each other, or the solids deaeration zone may be conical or cylindrical in shape. The solids deaeration zone is operable to deaerate and convey the solids to the solids pump zone. Importantly, in the solids deaeration zone, the solids become sufficiently compacted prior to and upon entry into the solids pump zone to be effectively conveyed through the solids pump zone. The particulate material, e.g., pulverized dry coal, moving through the solids deaeration zone can be deaerated to very low levels, well below the fluidization threshold. The solids deaeration zone is capable of being pressure regulated and may be operated at positive or negative pressures relative to pressure in the bottom of the solids source zone, e.g., reservoir.

The solids deaeration zone design criteria are based on the properties of the particulate (granular) material to be conveyed from a feed hopper to a pump inlet. The main function of the deaeration zone is to provide a transition zone where pneumatically conveyed dilated particulate (granular) material is allowed to deaerate to a dense state suitable for feed to a pump. An example of a conical geometry of such a deaeration zone is shown in FIG. 8. As shown in FIG. 8, the opening diameter of the conical shaped deaeration zone, $D_a$, is set by the deaeration velocity of the material, the desired mass flow rate, and the voidage (expected to be the voidage associated with minimum fluidization, $\epsilon_{mf}$). The outlet diameter of the cone, $D_o$ is set by the dimensions of the feed entrance of the pump. The other properties of the deaeration zone, such as the height, H, of the cone and the cone angle are determined based on the conveying criteria and the properties of the particulate (granular) material.

The deaeration zone should be designed so that suitable deaeration and consolidation of the particulate (granular) material takes place while preventing plugging or choked flow to the pump due to the frictional properties of the particulate (granular) material. Referring to FIG. 8, it is important to choose a suitable deaeration zone height, H, and cone wall angle, α, to enable steady state deaeration, compaction, and feed flow to the pump. It is important to note that it is assumed that the particles are much smaller than the outlet diameter, $D_o$. It is also assumed that cohesion is negligible. Both assumptions appear valid for a pumping operation.

Figure 9:
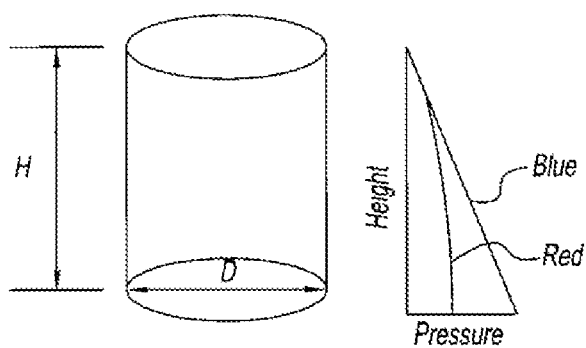
FIG. 9 is a drawing illustrating saturation of pressure in a particulate (granular) material (red line). The pressure in a column of liquid (blue line) linearly increases with depth from the top surface.

It is known that particulate (granular) materials stored in a bin or silo (oftentimes a cylinder) exert frictional stresses against the sidewalls. See Nedderman, R. M., *Statics and Kinematics of Granular Materials*, pp. 47-126, 1992, Cambridge: Cambridge University Press; and Sperl, M., *Experiments on corn pressure in silo cells—translation and comment of Janssen's paper from 1895*, Granular Matter, 2006, 8(2), pp. 59-65; the disclosures of which are incorporated herein by reference. As a result of this phenomenon, the weight of a column of particulate (granular) material is carried by not only the base of the container, but the vertical sidewalls as well. While the pressure in a column of fluid is known to vary hydrostatically, the pressure increases linearly with depth from the top, the pressure in a column of particulate (granular) material interacting frictionally with the sidewalls tends to saturate with height (red curve) as shown in FIG. 9. At the point where the curve first becomes vertical, the weight of the solids is transferred to the containing vertical walls forming a plug that frictionally supports the solids above that point.

The tendency of particulate (granular) materials to frictionally balance their weight with the sidewalls has implications for the ability to drain them from geometries such as those shown in FIGS. 7 and 8. The relationship between stress σ in the vertical direction and depth z (with z=0 at the top of the cylinder) as a function of the internal friction angle of the particulate (granular) material, ϕ, the wall friction angle of the material, $\phi_{wall}$, the material density, $\rho_p$, voidage, ε, and cylinder diameter, D, defines a critical height $z_c$ above which a stable plug will form. The following equation 2A defines this critical height as a function of solids properties ϕ, $\phi_{wall}$, $\rho_p$, and ε for the active state κ=1 for a substantially conical shaped deaeration zone:

$$\frac{z_c}{D} = \frac{1 - \kappa \sin\varphi \cos(\varpi + \kappa\varphi_{wall})}{4\tan\varphi_{wall}(1 + \kappa\sin\varphi\cos(\varpi + \kappa\varphi_{wall}))} \quad \text{(Eq. 2A)}$$

where:

$$\sin\varpi = \frac{\sin\varphi_{wall}}{\sin\varphi}$$

The maximum aspect ratio ($H_{max}/D_o$) of the substantially conical shaped deaeration zone can be determined by the equation:

$$\frac{H_{max}}{D_o} = \frac{2.5(1 - \kappa\sin\varphi\cos(\varpi + \kappa\varphi_{wall}))}{4\tan\varphi_{wall}(1 + \kappa\sin\varphi\cos(\varpi + \kappa\varphi_{wall}))} \quad \text{(Eq. 2B)}$$

where:

$$\sin\varpi = \frac{\sin\varphi_{wall}}{\sin\varphi}$$

wherein $H_{max}$ is the maximum height, $D_o$ is the characteristic dimension of the deaeration zone outlet surface, ϕ is the internal friction angle of the particulate (granular) material, $\phi_{wall}$ is the wall friction angle of the particulate (granular) material, and κ=1 is the active state of the solids. Preferably, for a substantially conical deaeration zone, $H_{max}/D_o$ should be less than or equal to about $2.5*z_c/D$ (as shown in equation 2B). In a most preferred embodiment for a substantially conical deaeration zone, $H_{max}/D_o$ is less than or equal to about $1.0*z_c/D$.

Similarly, for a substantially rectangular shaped deaeration zone the following equation 3A defines this critical height as a function of solids properties ϕ, $\phi_{wall}$, $\rho_p$, W as defined as the width of the deaeration zone as shown in FIG. 1, the solids pump inlet gap "G", and ε for the active state κ=1 for a substantially rectangular shaped deaeration zone:

$$\frac{z_c}{G} = \frac{W[1 - \kappa\sin\varphi\cos(\varpi + \kappa\varphi_{wall})]}{2(W + G)\tan\varphi_{wall}(1 + \kappa\sin\varphi\cos(\varpi + \kappa\varphi_{wall}))} \quad \text{(Eq. 3A)}$$

where:

$$\sin\varpi = \frac{\sin\varphi_{wall}}{\sin\varphi}$$

The maximum aspect ratio ($H_{max}/G$) of the substantially rectangular shaped deaeration zone can be determined by the equation:

$$\frac{H_{max}}{G} = \frac{2.5W(1 - \kappa\sin\varphi\cos(\varpi + \kappa\varphi_{wall}))}{2(W + G)\tan\varphi_{wall}(1 + \kappa\sin\varphi\cos(\varpi + \kappa\varphi_{wall}))} \quad \text{(Eq. 3B)}$$

where:

$$\sin\varpi = \frac{\sin\varphi_{wall}}{\sin\varphi}$$

wherein $H_{max}$ is the maximum height, G is the Gap Dimension as defined herein as the dimension between the opposing pump moving walls at the inlet to the solids pump, W is defined as the width of the deaeration zone as shown in FIG. 1, $\phi$ is the internal friction angle of the particulate (granular) material, $\phi_{wall}$ is the wall friction angle of the particulate (granular) material, and $\kappa=1$ is the active state of the solids. Preferably, for a substantially rectangular deaeration zone, $H_{max}/G$ should be less than or equal to about $2.5*z_c/G$ (as shown in equation 2B). In a most preferred embodiment for a substantially rectangular deaeration zone, $H_{max}/G$ is less than or equal to about $1.0*z_c/G$.

Nedderman, supra, notes that the vertical stress will reach 90% of its saturated value at a depth of approximately $2.5z_c$. This has implications for how tall of a column of material can be created before plugging may become an issue. If the stress at a given depth has reached its saturated value, then that means the material at that position can most likely sustain a stress even larger than the weight of the material above it (hence a plug). As a result, the aspect ratio for a vertical cylindrical zone $H_{max}/D$ should preferably not exceed $2.5z_c/D$ and more preferably not exceed $z_c/D$.

The above calculation represents an extreme case for completely vertical walls such as the case shown in FIG. 9. The design for an aeration zone will involve a cone where the walls are at an angle with respect to vertical, $\alpha$. If the above criterion is followed rigorously for the maximum height, $H_{max}$ (with $D_o$ as the diameter), then the cone wall angle as defined by Equation 4 below is set by the criteria in Equation 2A and the diameter required for deaeration, $D_a$, is defined by Equation 1B.

$$\alpha = \text{Tan}^{-1}((D_a - D_o)/2H_{max}) \quad \text{(Eq. 4)}$$

For FIG. 7, the wall angle for a substantially rectangular deaeration zone is defined by Equation 5 below.

$$\theta = \text{Tan}^{-1}(L/H_{max}) \quad \text{(Eq. 5)}$$

Figure 10:
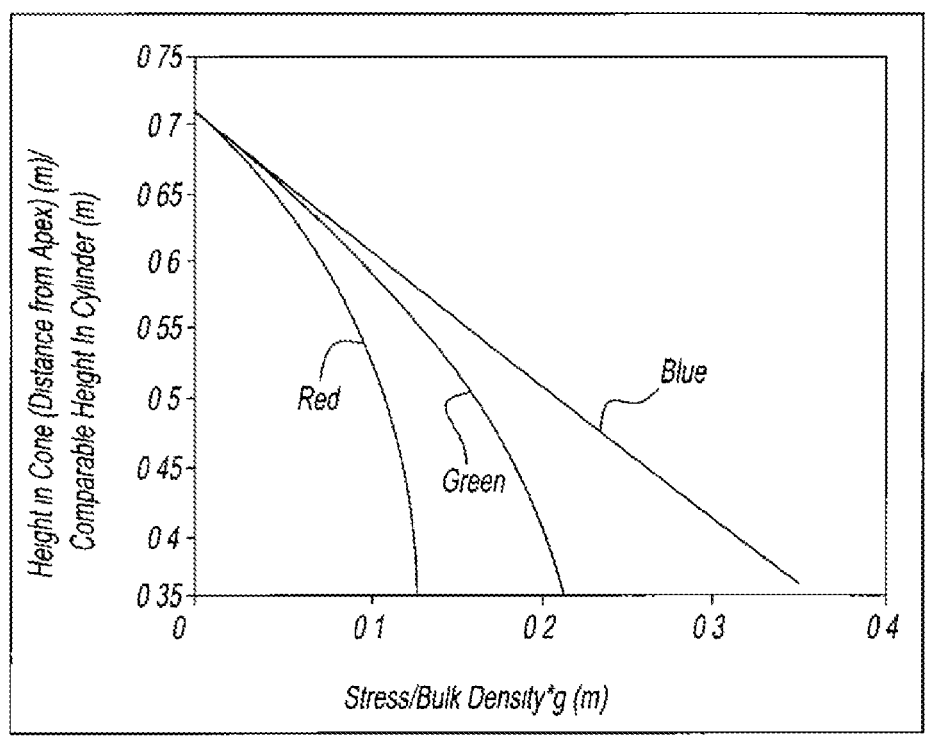
FIG. 10 is a graphical representation of a stress profile from equation 4 is given by the green line. The hydrostatic result for a material of the same height as the cone is given by the blue line. The result for the stress profile as a function of height in a cylinder of diameter $D_o$ is given by the red line.

In a conical deaeration zone example where $\phi=30°$, $\phi_{wall}=25°$, $D_a=0.6$ meters and $D_o=0.3$ meters, Equation 4 yields a cone angle of approximately 22°. The height of this cone is 0.35 meters. As a result, the stress profile from Equation 4 is shown in FIG. 10.

Setting design criteria for a conical deaeration zone based on calculations from the maximum height criterion for a cylindrical deaeration zone results in a stress profile that exceeds the design limits for the cylindrical deaeration zone. The cylindrical zone criterion was the aspect ratio for which the stress reached only 90% of its saturated value. A more strict criterion could be chosen which would scale $z_c$ by some multiplicative factor other than 2.5. This would impact Equation 2B setting a new cone angle for a conical deaeration zone.

As the particulate material moves down through the solids deaeration zone, the particulate material deaerates and compacts to a degree. As a result, the particulate material achieves a certain degree of deaeration and compaction adjacent the inlet port to the solids pump zone and forms relatively strong stress transmitting particle contact bridges between the solids pump zone components adjacent the inlet port. Accordingly, the suitably compacted particulate material is effectively gripped and moved between the solids pump zone components without substantial slippage between the particulate material and internal moving surfaces of the solids pump zone.

The deaeration zone is configured to convey fine particulate material to the inlet port of the solids pump zone and to deaerate the particulate material during conveyance. The configuration can be any sloped wall container capable of conveying and deaerating the particulate material. For example, the container can have one continuously sloped wall that converges in the longitudinal direction from the inlet toward the outlet, defining a passageway, and forming an angle to a vertical plane, i.e., a conical shaped container. Alternatively, the container can have a first sloped wall and a second sloped wall that are opposed to each other and that converge in the longitudinal direction from the inlet toward the outlet, defining a passageway, and each forming an angle to a vertical plane. The solids deaeration zone can further include a screw or other positive displacement device.

The deaerator vent gas may be vented to atmosphere and/or may be induced by an exhauster fan. Alternatively, gases from the deaerator can be passed back into the reservoir. As discussed above, the pressure in the solids deaeration zone does not need to be at a pressure lower than atmospheric, but requires that the deaeration gases in the solids deaeration zone be vented to a pressure that is lower than the solids source zone.

Figure 11:
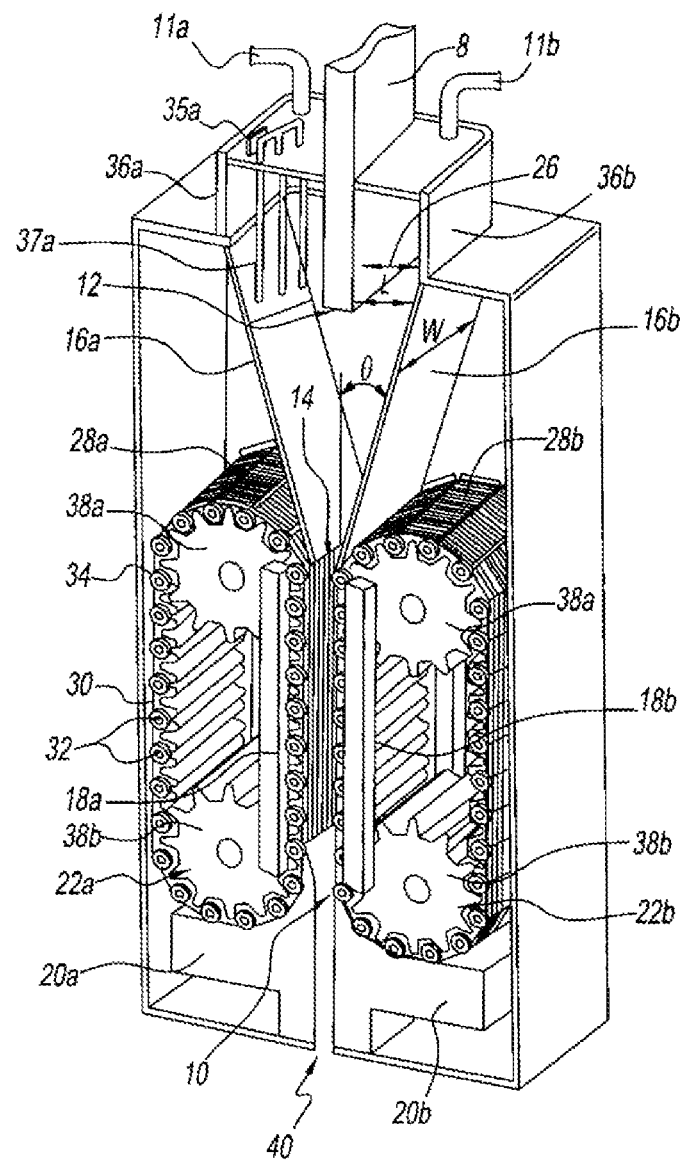
FIG. 11 is a perspective view of a solids supply system including a solids deaeration zone equipped with vertical surfaces to assist in deaeration, and a solids pump (belt/tractor) zone.

FIG. 11 shows a perspective view of a solids supply system including a solids deaeration zone and a solids pump zone for transporting pulverized dry coal. The solids supply system depicted in FIG. 11 is essentially the same as the solids supply system depicted in FIG. 1 except for the addition of vertical surfaces in the form of rods, bars or plates and applying vibration to same. The solids supply system depicted in FIG. 11 includes devices to stimulate deaeration and prevent pluggage by adding vertical surfaces in the form of rods, bars, or plates 37a which can be vibrated. Vibration can be applied using a vibrator 35a. The solids supply system may also utilize a pneumatic source, for applying a pneumatic pulse inside the deaerator jacket that will stimulate deaeration of the material inside the deaerator. The effect of using vertical surfaces in conjunction with vibration or to use a pneumatic pulse inside the deaerator jacket is to increase the apparent deaeration velocity, UdA in Equations 1A and 1B. The solids may then be conveyed to the solids pump zone at speeds higher than what might otherwise be achieved using gravity settling alone. The solids deaeration zone and solids pump zone are as described above for FIG. 1.

The particulate material gradually deaerates moving down through the solids deaeration zone with the aid of the sloped walls and gravity. The particulate material achieves a certain degree of compaction adjacent to an inlet port to the solids pump zone and forms relatively strong stress transmitting particle contact bridges between the solids pump zone components adjacent the inlet port. As a consequence, the particulate material is effectively conveyed into the transport channel and driven by the motion of the solids pump without substantial slipping between the particulate material and the internal surfaces of the solids pump. The particulate material moving through the solids deaeration zone can be deaerated to very low levels, below the fluidization threshold.

The ability of the particulate material to deaerate and to achieve a suitable degree of compaction within the solids deaeration zone is dependant in part on the density, bulk modulus, and the internal friction angle of the particulate material. The length and/or height of the solids deaeration zone and the particulate material free surface area are determined by the ability of the particulate material to deaerate and the time required to achieve such a suitable compaction. Different particulate materials will deaerate at different rates. Thus, the length of the solids deaeration zone and the particulate material free surface area needed is designed so as to allow sufficient deaeration of the specific material(s) for which the solids deaeration zone is to convey.

The time required for deaeration of the particulate material is also affected by the friction between the particulate material and the internal wall(s) of the solids deaeration zone. The internal surface can be made of or coated with a low friction material (such as for example, polytetrafluoroethylene or other suitable ultra-high molecular weight materials or a polished metal surface with a surface roughness ($R_a$) of 15 to 30 micro inches) to reduce friction between the particulate material and the internal surface of the solids deaeration zone.

Advantages of this disclosure include, for example, removing any delay time required for deaeration and improving the consistency of the pump feed rate. Other advantages of this disclosure include improving pump efficiency. The deaeration zone operates generally to remove air from the solids flow and control feedrate to the solids pump zone.

The solids deaeration zone may be constructed separately from the solids pump zone, in which case, the solids deaeration zone and the inlet duct to the solids pump zone can be connected by any appropriate means, such as welds, coupleable flanges, bolts connectors or the like. Alternatively, the solids deaeration zone and the inlet duct to the solids pump zone may be formed as a unitary structure.

The solids pump zone is in flow communication with the solids deaeration zone. The solids pump zone includes a solids pump that is operable to convey the solids to an application, e.g., gasification process, a pressurized pulverized coal fired steam boiler, or a process requiring a feed system for Geldart classification type "A" or "C" material.

The solids pump, e.g., variable speed high pressure solids pump, useful herein can both meter the flow of solids into an application or to a dispenser vessel, and increase the pressure from atmospheric pressure. This system for supplying an application or for filling a high pressure dispenser vessel may be operated continuously and the speed of the pump may be controlled so that a nearly constant level of solids may be maintained. The pump will be capable of providing solids to an application or a dispenser vessel at least as rapidly as the solids are used or discharged for use. The solids pump can discharge directly into a high pressure conduit for fluidization and conveying to an application such as a gasification process, a pressurized pulverized coal fired steam boiler, or any process requiring a feed system for Geldart classification type "A" or "C" material.

Valves, e.g., isolation valves, may be added at one or more points between the solids pump zone and the application or dispenser vessel to assist in depressurizing and isolating parts of the system for cleaning and maintenance purposes. Further, vents may be provided on the dispenser vessel for assisting with the pressure adjustment of the vessel and helping to regulate the solids flow out of the dispenser vessel.

In an embodiment, additional solids pumps may be added in parallel with the first pump to supply the same application or dispenser vessel, or other applications or dispenser vessels. The different solids pumps, applications and dispenser vessels do not have to have the same capacity requirements and their fill levels may be maintained independently of each other.

Metered and pressurized solids leave the solids pump outlet at a higher pressure than in the reservoir, are conveyed to an application or a pressurized dispenser vessel. The solids pump can be controlled by a control system which can vary the speed of the motor driving the solids pump, based upon signals from the application or signals indicative of the weight of the dispenser vessel provided by load cells or level sensors. The control system can provide a control signal to the motor. Manual (via a human operator) or automatic control signals from other systems may also be provided to the control system, based upon process conditions, such as those occurring within a gasification process. System data signals can be provided to remote locations to apprise operators of operating conditions.

This disclosure also includes an arrangement that contains two or more solids pumps in parallel between a single reservoir and a single application or pressurized dispenser vessel. This arrangement would allow for greater capacity or for redundancy in case of a pump failure. This disclosure also includes an arrangement that contains two or more solids pumps in series for cases where one solids pump cannot achieve the pressure rise required by the system. Solids pumps in series would be in a cascade scheme, each delivering fine solids at higher pressure to the next solids pump.

Illustrative dry coal extrusion pumps useful in this disclosure include, for example, belt (tractor) pumps, roller pumps and rotary pumps such as described in U.S. Pat. Nos. 7,387,197 B2, 5,497,873, 4,988,239, and 4,516,674 and U.S. Patent Application Publication Nos. 2006/0243583 A1 and 2009/0178336 A1, the disclosures of which are incorporated herein by reference in their entirety.

Illustrative belt (tractor) pumps useful in this disclosure are described, for example, in U.S. Pat. No. 7,387,197 B2. A preferred belt (tractor) pump includes a pump having a passageway defined by a first belt assembly and a second belt assembly, wherein each of the first belt assembly and the second belt assembly has an interior section and wherein the first belt assembly and the second belt assembly are opposed to each other; an inlet for introducing particulate material, e.g., pulverized dry coal, into the passageway; an outlet for expelling the particulate material from the passageway; a first load beam positioned within the interior section of the first belt assembly; a second load beam positioned within the interior section of the second belt assembly; a first scraper seal and a second scraper seal positioned proximate the passageway and the outlet; a first drive assembly positioned within the interior section of the first belt assembly for driving the first belt assembly; and a second drive assembly positioned within the interior section of the second belt assembly for driving the second belt assembly. In accordance with this disclosure, the particulate material enters the belt (tractor) pump inlet from the deaeration zone sufficiently compacted to form a transient solid or bridge composed of compacted particulate material that allows the belt (tractor) pump to develop head or pressure in the particulate material and effectively convey the particulate material through the belt (tractor) pump.

Illustrative roller pumps useful in this disclosure are described, for example, in U.S. Patent Application Publication No. 2006/0243583 A1. A preferred roller pump includes a pump having an inlet operable to receive a particulate material; a roller system operable to pressurize the particulate material, the roller system including: a first motive roller adjacent to the inlet, the first motive roller operable to pressurize the particulate material to a first pressure level; a second motive roller adjacent to the inlet and displaced a first distance across from the first motive roller, the second motive roller receiving the particulate material of the first pressure level and further pressurizing the particulate material to a second pressure level; and an outlet adjacent to the roller system, the outlet operable to dispense the particulate material at a high pressure to an application. In accordance with this disclosure, the particulate material enters the roller pump inlet from the deaeration zone sufficiently compacted to form a transient solid or bridge composed of compacted particulate material that allows the roller pump to develop head or pressure in the particulate material and effectively convey the particulate material through the roller pump.

Illustrative rotary pumps useful in this disclosure are described, for example, in U.S. Pat. Nos. 5,497,873, 4,988,239, 4,516,674, and U.S. Patent Application Publication No. 2009/0178336 A1. A preferred rotary pump includes a pump having a moveable wall structure defining a transport channel and having an inlet for receiving particulate material, e.g., pulverized dry coal, into the channel and an outlet for emitting particulate material from the channel, wherein the moveable wall structure defines at least one wall moveable in the direction from the inlet toward the outlet for imparting a force directed toward the outlet on the particulate material entering the channel from the inlet. In accordance with this disclosure, the particulate material enters the rotary pump inlet from the deaeration zone sufficiently compacted to form a transient solid or bridge composed of compacted particulate material that allows the rotary pump to develop head or pressure in the particulate material and effectively convey the particulate material through the rotary pump.

It will be appreciated that conventional equipment can be used to perform the various functions of the solids supply system, such as monitoring and automatically regulating the flow of solids so that it can be fully automated to run continuously in an efficient manner.

The solids supply system described herein can be controlled by a control system. The control system may control operations of the solids source zone, solids deaeration zone, and solids pump zone. Illustrative operations include controlling particulate material flow rate throughout the solids supply system, speed of the pump motor in the solids pump zone, and the like. For example, in the solids pump zone, one or more solids pumps can be controlled by a control system which can vary the speed of the electric motor driving each solids pump, based upon signals from an application, for example, signals indicative of the weight of a dispenser vessel provided by load cells or level sensors. The control system can provide a control signal to each of the electric motors. Manual (via a human operator) or automatic control signals from other systems may also be provided to the control system, based upon process conditions, such as those occurring within gasification processes. System data signals can again be provided to remote locations to provide system status information to the operators.

Various modifications and variations of this disclosure will be obvious to a worker skilled in the art and it is to be understood that such modifications and variations are to be included within the purview of this application and the spirit and scope of the claims.

While we have shown and described several embodiments in accordance with our disclosure, it is to be clearly understood that the same may be susceptible to numerous changes apparent to one skilled in the art. Therefore, we do not wish to be limited to the details shown and described but intend to show all changes and modifications that come within the scope of the appended claims.

What is claimed is:

1. A solids supply system comprising:
(i) a solids deaeration zone, and
(ii) a solids pump zone;
wherein said solids deaeration zone is in flow communication with said solids pump zone; said solids deaeration zone comprises a container having a passageway defined by one or more sloped walls; an inlet for introducing solids into the passageway; an outlet for dispensing solids from the passageway into said solids pump zone; wherein said one or more sloped walls converge in the longitudinal direction from the inlet toward the outlet, forming a wall angle to a vertical plane; said solids deaeration zone operable to deaerate and convey the solids by gravity to said solids pump zone, wherein said solids become sufficiently compacted prior to and upon entry into said solids pump zone to be effectively conveyed through said solids pump zone; said solids deaeration zone being fluidly connected to a region of lower pressure than said solids deaeration zone wherein at least a portion of a fluidization gas in said solids is withdrawn from said solids deaeration zone;
wherein said solids pump zone comprises a solids pump operable to convey said solids to an application; and
wherein said container is of a substantially rectangular shape and has a maximum aspect ratio ($H_{max}/G$) determined by the equation:

$$\frac{H_{max}}{G} = \frac{2.5W(1 - \kappa\sin\varphi\cos(\varpi + \kappa\varphi_{wall}))}{2(W + G)\tan\varphi_{wall}(1 + \kappa\sin\varphi\cos(\varpi + \kappa\varphi_{wall}))}$$

where:

$$\sin\varpi = \frac{\sin\varphi_{wall}}{\sin\varphi}$$

wherein $H_{max}$ is the maximum height, G is the Gap Dimension between the opposing pump moving walls at the inlet to the solids pump, W is the width of the deaeration zone, $\varphi$ is the internal friction angle of the particulate (granular) material, $\varphi_{wall}$ is the wall friction angle of the particulate (granular) material, and $\kappa=1$ is the active state of the solids.

2. The solids supply system of claim 1, wherein said solids become sufficiently compacted prior to and upon entry into said solids pump zone to form a transient solid or bridge composed of compacted particulate material that allows the solids pump to develop head or pressure in the particulate material and effectively convey the particulate material through the solids pump.

3. The solids supply system of claim 1, wherein the container has said wall angle, a height and a particulate material free surface area sufficient to deaerate and convey the solids by gravity to said solids pump zone, wherein said solids become sufficiently compacted prior to and upon entry into said solids pump zone to be effectively conveyed through said solids pump zone.

4. The solids supply system of claim 3, wherein said wall angle is from about 5 degrees to about 85 degrees, the height of the container from the inlet to the outlet is from about 0.1 m to about 3 m, and the particulate material free surface area of the container is from about 0.1 m² to about 10 m².

5. The solids supply system of claim 1, wherein said wall angle is equal to θ as determined by the equation:

$$\theta = \text{Tan}^{-1}(L/H_{max})$$

wherein L is the characteristic dimension of the deaeration zone inlet, and $H_{max}$ is the maximum height; wherein L is from about $0.5*L_{min}$ to about $1.5*L_{min}$, wherein $L_{min}$ is determined by the equation:

$$L_{min} = M_s/(2\rho)(W)(UdA)$$

wherein $M_s$ is the downward mass flow rate of solids, ρ is the flowing density of solids in the deaeration zone, W is the width of the deaeration plenum, and UdA the solids settling or deaeration velocity.

6. The solids supply system of claim 1, wherein said container comprises (i) one continuously sloped wall that converges in the longitudinal direction from the inlet toward the outlet, defining a passageway, and forming a wall angle to a vertical plane, or (ii) a first sloped wall and a second sloped wall that are opposed to each other and that converge in the longitudinal direction from the inlet toward the outlet, defining a passageway, and each forming a wall angle to a vertical plane.

7. The solids supply system of claim 1, wherein the solids pump zone comprises a belt (tractor) pump, a roller pump, or a rotary pump.

8. The solids supply system of claim 1, wherein the solids comprise a Geldart classification type "A" or "C" material.

9. The solids supply system of claim 8, wherein the solids comprise a pulverized dry coal.

10. The solids supply system of claim 1, wherein the application comprises a gasification process, a pressurized pulverized coal fired steam boiler, or a process requiring a feed system for Geldart classification type "A" or "C" material.

11. The solids supply system of claim 1, further comprising multiple solids source systems in parallel and/or multiple solids pump systems in parallel.

12. The solids supply system of claim 1, wherein the solids pump zone is comprised of an inlet and an outlet and the differential pressure between the solids pump zone outlet and solids pump zone inlet is from 200 to 2,000 psig.

13. A method for transporting solids comprising:
(i) providing a solids deaeration zone and a solids pump zone, wherein said solids deaeration zone is in flow communication with said solids pump zone; said solids deaeration zone comprises a container having a passageway defined by one or more sloped walls; an inlet for introducing solids into the passageway; an outlet for dispensing solids from the passageway into said solids pump zone; wherein said one or more sloped walls converge in the longitudinal direction from the inlet toward the outlet, forming a wall angle to a vertical plane; said solids deaeration zone operable to deaerate and convey the solids by gravity to said solids pump zone; said solids deaeration zone being fluidly connected to a region of lower pressure than said solids deaeration zone wherein at least a portion of a fluidization gas in said solids is withdrawn from said solids deaeration zone; and said solids pump zone comprises a solids pump operable to transport said solids; wherein said container is of a substantially rectangular shape and has a maximum aspect ratio ($H_{max}/G$) determined by the equation:

$$\frac{H_{max}}{G} = \frac{2.5W(1 - \kappa\sin\varphi\cos(\varpi + \kappa\varphi_{wall}))}{2(W+G)\tan\varphi_{wall}(1 + \kappa\sin\varphi\cos(\varpi + \kappa\varphi_{wall}))}$$

where:

$$\sin\varpi = \frac{\sin\varphi_{wall}}{\sin\varphi}$$

wherein $H_{max}$ is the maximum height, G is the Gap Dimension between the opposing pump moving walls at the inlet to the solids pump, W is the width of the deaeration zone, φ is the internal friction angle of the particulate (granular) material, $\phi_{wall}$ is the wall friction angle of the particulate (granular) material, and κ=1 is the active state of the solids; and (ii) deaerating the solids in the solids deaeration zone, wherein said solids become sufficiently compacted prior to and upon entry into said solids pump zone to be effectively conveyed through said solids pump zone; and (iii) pumping the solids in the solids pump zone to an application.

14. The method of claim 13, wherein said solids become sufficiently compacted prior to and upon entry into said solids pump zone to form a transient solid or bridge composed of compacted particulate material that allows the solids pump to develop head or pressure in the particulate material and effectively convey the particulate material through the solids pump.

15. The method of claim 13, wherein the container has said wall angle, a height and a particulate material free surface area sufficient to deaerate and convey the solids by gravity to said solids pump zone, wherein said solids become sufficiently compacted prior to and upon entry into said solids pump zone to be effectively conveyed through said solids pump zone.

16. The method of claim 15, wherein said wall angle is from about 5 degrees to about 85 degrees, the height of the container from the inlet to the outlet is from about 0.1 m to about 3 m, and the particulate material free surface area of the container is from about 0.1 m² to about 10 m².

17. The method of claim 13, wherein said wall angle is equal to θ as determined by the equation:

$$\theta = \text{Tan}^{-1}(L/H_{max})$$

wherein L is the characteristic dimension of the deaeration zone inlet, and $H_{max}$ is the maximum height; wherein L is from about $0.5*L_{min}$ to about $1.5*L_{min}$, wherein $L_{min}$ is determined by the equation:

$$L_{min} = M_s/(2\rho)(W)(UdA)$$

wherein $M_s$ is the downward mass flow rate of solids, ρ is the flowing density of solids in the deaeration zone, W is the width of the deaeration plenum, and UdA the solids settling or deaeration velocity.

18. The method of claim 13, wherein said container comprises (i) one continuously sloped wall that converges in the longitudinal direction from the inlet toward the outlet, defining a passageway, and forming a wall angle (θ) to a vertical plane, or (ii) a first sloped wall and a second sloped wall that are opposed to each other and that converge in the longitudinal direction from the inlet toward the outlet, defining a passageway, and each forming a wall angle (θ) to a vertical plane.

19. The method of claim 13, wherein the solids pump zone comprises a belt (tractor) pump, a roller pump, or a rotary pump.

20. The method of claim 13, wherein the solids comprise a Geldart classification type "A" or "C" material.

21. The method of claim 20, wherein the solids comprise a pulverized dry coal.

22. A solids supply system comprising:
(ii) a solids deaeration zone, and
(ii) a solids pump zone;
wherein said solids deaeration zone is in flow communication with said solids pump zone; said solids deaeration zone comprises a container having a passageway defined by one or more sloped walls; an inlet for introducing solids into the passageway; an outlet for dispensing solids from the passageway into said solids pump zone; wherein said one or more sloped walls converge in the longitudinal direction from the inlet toward the outlet, forming a wall angle to a vertical plane; said solids deaeration zone operable to deaerate and convey the solids by gravity to said solids pump zone, wherein said solids become sufficiently compacted prior to and upon entry into said solids pump zone to be effectively conveyed through said solids pump zone; said solids deaeration zone being fluidly connected to a region of lower pressure than said solids deaeration zone wherein at least a portion of a fluidization gas in said solids is withdrawn from said solids deaeration zone;
wherein said solids pump zone comprises a solids pump operable to convey said solids to an application; and
wherein said container is of a substantially conical shape and has a maximum aspect ratio ($H_{max}/D_o$) determined by the equation:

$$\frac{H_{max}}{D_o} = \frac{2.5(1 - \kappa\sin\varphi\cos(\varpi + \kappa\varphi_{wall}))}{4\tan\varphi_{wall}(1 + \kappa\sin\varphi\cos(\varpi + \kappa\varphi_{wall}))}$$

where:

$$\sin\varpi = \frac{\sin\varphi_{wall}}{\sin\varphi}$$

wherein $H_{max}$ is the maximum height, $D_o$ is the dimension of the deaeration zone outlet diameter, $\varphi$ is the internal friction angle of the particulate (granular) material, $\varphi_{wall}$ is the wall friction angle of the particulate (granular) material, and $\kappa=1$ is the active state of the solids.

23. The solids supply system of claim 22, wherein said wall angle is equal to $\alpha$ as determined by the equation:

$$\alpha = \text{Tan}^{-1}((D_a - D_o)/2H_{max})$$

wherein $D_a$ is the deaeration zone inlet diameter, $D_o$ is the deaeration zone outlet diameter, and $H_{max}$ is the maximum height; wherein $D_a$ is from about $0.5*D_{a\ min}$ to about $1.5*D_{a\ min}$, wherein $D_{a\ min}$ is determined by the equation:

$$D_{a\ min} = [4*M_s/(\rho)(UdA)(\pi)]^{0.5}$$

wherein $M_s$ is the downward mass flow rate of solids, $\rho$ is the flowing density of solids in the deaeration zone, and UdA the solids settling or deaeration velocity.

24. A method for transporting solids comprising:
(i) providing a solids deaeration zone and a solids pump zone, wherein said solids deaeration zone is in flow communication with said solids pump zone; said solids deaeration zone comprises a container having a passageway defined by one or more sloped walls; an inlet for introducing solids into the passageway; an outlet for dispensing solids from the passageway into said solids pump zone; wherein said one or more sloped walls converge in the longitudinal direction from the inlet toward the outlet, forming a wall angle to a vertical plane; said solids deaeration zone operable to deaerate and convey the solids by gravity to said solids pump zone; said solids deaeration zone being fluidly connected to a region of lower pressure than said solids deaeration zone wherein at least a portion of a fluidization gas in said solids is withdrawn from said solids deaeration zone; and said solids pump zone comprises a solids pump operable to transport said solids; wherein said container is of a substantially conical shape and has a maximum aspect ratio ($H_{max}/D_o$) determined by the equation:

$$\frac{H_{max}}{D_o} = \frac{2.5(1 - \kappa\sin\varphi\cos(\varpi + \kappa\varphi_{wall}))}{4\tan\varphi_{wall}(1 + \kappa\sin\varphi\cos(\varpi + \kappa\varphi_{wall}))}$$

where:

$$\sin\varpi = \frac{\sin\varphi_{wall}}{\sin\varphi}$$

wherein $H_{max}$ is the maximum height, $D_o$ is the dimension of the deaeration zone outlet diameter, $\varphi$ is the internal friction angle of the particulate (granular) material, $\varphi_{wall}$ is the wall friction angle of the particulate (granular) material, and $\kappa=1$ is the active state of the solids; and
(ii) deaerating the solids in the solids deaeration zone, wherein said solids become sufficiently compacted prior to and upon entry into said solids pump zone to be effectively conveyed through said solids pump zone; and
(iii) pumping the solids in the solids pump zone to an application.

25. The method of claim 24, wherein said wall angle is equal to $\alpha$ as determined by the equation:

$$\alpha = \text{Tan}^{-1}((D_a - D_o)/2H_{max})$$

wherein $D_a$ is the deaeration zone inlet diameter, $D_o$ is the deaeration zone outlet diameter, and $H_{max}$ is the maximum height; wherein $D_a$ is from about $0.5*D_{a\ min}$ to about $1.5*D_{a\ min}$, wherein $D_{a\ min}$ is determined by the equation:

$$D_{a\ min} = [4*M_s/(\rho)(UdA)(\pi)]^{0.5}$$

wherein $M_s$ is the downward mass flow rate of solids, $\rho$ is the flowing density of solids in the deaeration zone, and UdA the solids settling or deaeration velocity.

* * * * *